United States Patent
Le Perchec

(10) Patent No.: US 12,320,997 B2
(45) Date of Patent: Jun. 3, 2025

(54) OPTICAL FILTERING DEVICE

(71) Applicant: Commissariat à l'Energie Atomique et aux Energies Alternatives, Paris (FR)

(72) Inventor: Jérôme Le Perchec, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 938 days.

(21) Appl. No.: 17/447,225

(22) Filed: Sep. 9, 2021

(65) Prior Publication Data

US 2022/0075106 A1   Mar. 10, 2022

(30) Foreign Application Priority Data

Sep. 10, 2020 (FR) ..................................... 20 09172

(51) Int. Cl.
*G02B 5/26* (2006.01)
*G02F 1/01* (2006.01)

(52) U.S. Cl.
CPC ............. *G02B 5/26* (2013.01); *G02F 1/0121* (2013.01); *G02F 2203/055* (2013.01)

(58) Field of Classification Search
CPC .... G02B 5/26; G02F 1/0121; G02F 2203/055
See application file for complete search history.

(56) References Cited

U.S. PATENT DOCUMENTS 4,269,481 A * 5/1981 Yeh ........................... G02F 1/21
372/105
2010/0059663 A1   3/2010 Desieres
(Continued)

FOREIGN PATENT DOCUMENTS

FR   2 959 021 A1   10/2011
FR   3 007 148 A1   12/2014
(Continued)

OTHER PUBLICATIONS

French Preliminary Search Report issued Jun. 4, 2021 in French Application 20 09172 filed on Sep. 10, 2020, 13 pages (with English Translation of Categories of Cited Documents & Written Opinion).
(Continued)

*Primary Examiner* — Georgia Y Epps
*Assistant Examiner* — Don J Williams
(74) *Attorney, Agent, or Firm* — Oblon, McClelland, Maier & Neustadt, L.L.P.

(57) ABSTRACT

A device having a transmission response with a maximum at a wavelength $\lambda_0$, this device including an intermediate layer which extends from a first optical filter to a second optical filter, this intermediate layer having a refractive index $n_8$ at the wavelength $\lambda_0$ and a thickness $h_8$, the refractive index $n_8$ being less than $3n_{12}/5$ and the thickness $h_8$ being between $\delta$ and $3\delta$, where the refractive index $n_{12}$ is greater than $5n_{10}/3$, where $n_{10}$ is the greatest of the refractive indices chosen from the group consisting of the refractive indices at the wavelength $\lambda_0$ of the media situated at the interface with the first filter, and the coefficient $\delta$ is defined by the following relationship:

$$1/\delta = (2\pi n_8/\lambda_0)((\lambda_0/(n_8 P))^2 - 1)^{0.5},$$

where P is the period of a grating of slits of the first filter.

15 Claims, 5 Drawing Sheets

(56) References Cited

U.S. PATENT DOCUMENTS

2016/0146989 A1 5/2016 Sakat et al.
2020/0066782 A1 2/2020 Bierret et al.

FOREIGN PATENT DOCUMENTS

WO     WO 2007/118895 A1    10/2007
WO     WO 2018/185265 A1    10/2018

OTHER PUBLICATIONS

Chan et al., "Optical transmission through double-layer metallic subwavelength slit arrays", Optics Letters, vol. 31, No. 4, Feb. 15, 2006, 3 pages.
Kim et al., "Efficient and monolithic polarization conversion system based on a polarization grating", Applied Optics, vol. 51, No. 20, Jul. 10, 2012, 6 pages.
Tuambilangana et al., "Two-mode model for metal-dielectric guided-mode resonance filters", Optics Express, vol. 23, No. 25, Nov. 30, 2015, 11 pages.

\* cited by examiner

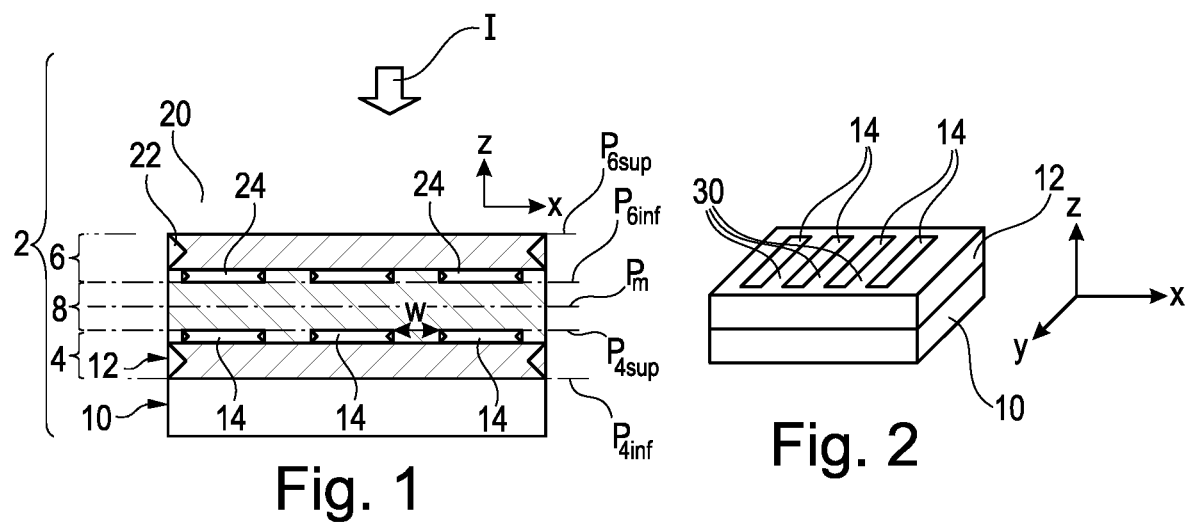
Fig. 1
Fig. 2
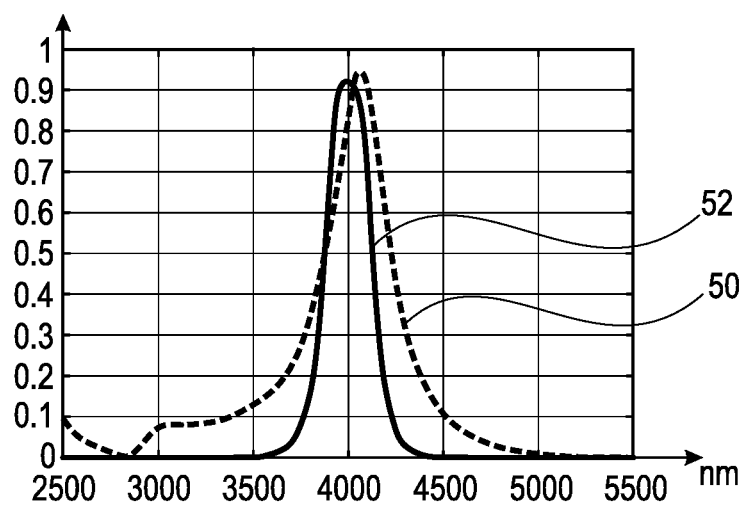
Fig. 3
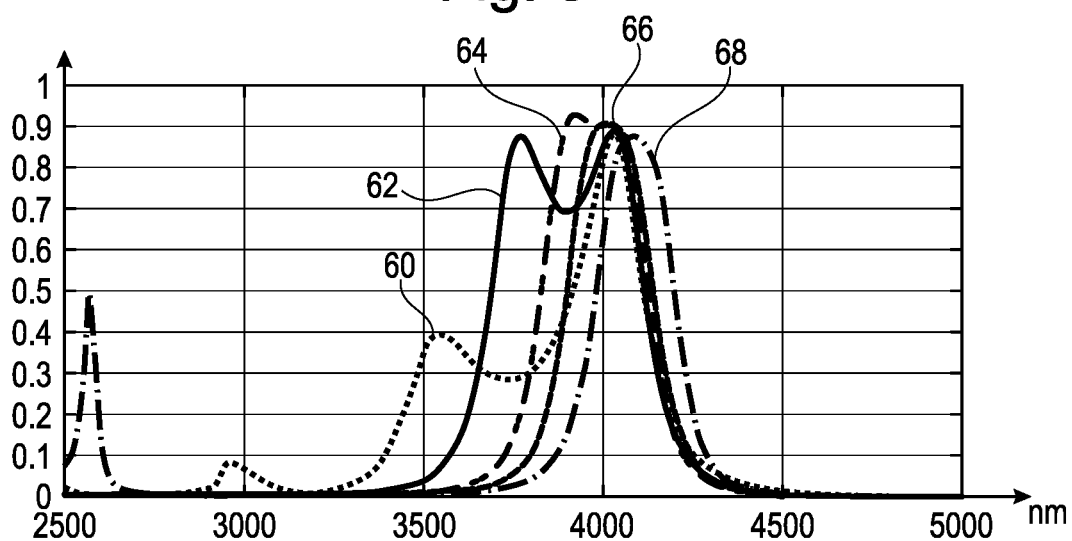
Fig. 4

OPTICAL FILTERING DEVICE

The present invention relates to an optical filtering device having a transmission response with a maximum at a wavelength $\lambda_0$. The invention relates also to a tunable optical filtering unit incorporating this optical filtering device.

Such filters are notably applicable in the field of visible and infrared photodetection, more particularly intended for the spectral detection of gases, and for visible and infrared colour imaging.

The micro- or nano-structured optical filtering devices are generally preferred for their great compactness which allows them to be incorporated in photodetectors.

Such optical filtering devices are for example disclosed in the U.S. Pat. No. 8,937,277B1. In this patent, the filtering device has a narrow transmission passband around the wavelength $\lambda_0$ and a significant rejection ratio outside of this passband. This narrow passband is also called "transmission peak" in this text. In this text, the transmission ratio is equal to the ratio between the quantity of incident electromagnetic radiation on the optical filtering device and the quantity of electromagnetic radiation having completely passed through the device. The transmission ratio is equal to 1 or to 100%, at a wavelength $\lambda$, when the device is completely transparent to that wavelength $\lambda$. The rejection ratio is the inverse of the transmission ratio. The rejection ratio is equal to 1 or 100%, at a wavelength $\lambda$, when the device is completely opaque to the electromagnetic radiation at that wavelength $\lambda$.

The optical filtering device of U.S. Pat. No. 8,937,277B1 offers numerous advantages, including in particular:—great compactness, —a narrow passband, —a transmission peak of significant amplitude, —a high rejection ratio over a wide band of frequencies situated around the transmission peak.

This known optical filtering device comprises reflective elements deposited on a face of a half-wave plate. These reflective elements define a sub-wavelength periodic grating of parallel through slits. The assembly formed by this grating and the waveguide plate constitutes a resonator that behaves as a passband filter around the wavelength $\lambda_0$.

The maximum amplitude of the transmission ratio at the wavelength $\lambda_0$ increases with the width of the slits. By contrast, as FIG. 6 of the U.S. Pat. No. 8,937,277B1 shows, the greater the width of the slits the more degraded the out-of-passband rejection ratio. Furthermore, the greater the width of the slits, the greater the width of the passband of the optical filtering device. Thus, the selectivity of this optical filtering device degrades as the width of the slits increases. Because of that, in the known optical filtering devices, it is accepted that the best trade-off is obtained when the width of the slits is systematically chosen to be less than P/3, where P is the periodicity of the slits. However, even by observing this constraint, it is difficult to obtain a high transmission ratio while retaining a high rejection ratio and a high selectivity.

Other filtering devices are known from FR3007148A1, WO2018/185265A1 and WO2007/118895A1. The filtering devices disclosed in these documents do not have high transmission ratios.

The invention aims to propose an optical filtering device which allows the transmission ratio to be increased without degrading, even enhancing, the rejection ratio and the selectivity.

To this end, the subject of the invention is an optical filtering device.

Also a subject of the invention is a tunable optical filtering unit which implements the above optical filtering device.

The present invention will be better understood on reading the following description, given purely as an example, and given in relation to the attached drawings in which:

FIG. 1 is a schematic view, in vertical cross-section, of a first embodiment of an optical filtering device;

FIG. 2 is a perspective view of an example of structure of a single-frequency optical filter of the device of FIG. 1;

FIG. 3 is a plot of the transmission response of the device of FIG. 1 and of the filter of FIG. 2;

FIG. 4 is a plot of the transmission response of the device of FIG. 1 for different thicknesses of an intermediate layer;

In these figures, the same references are used to denote the same elements. Hereinafter in this description, the features and functions that are well known to the person skilled in the art are not described in detail.

Figure 5:
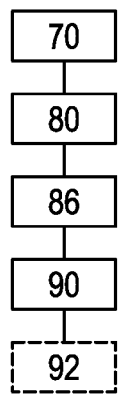
FIG. 5 is a flow diagram of a first method for manufacturing the device of FIG. 1.
Figure 6:
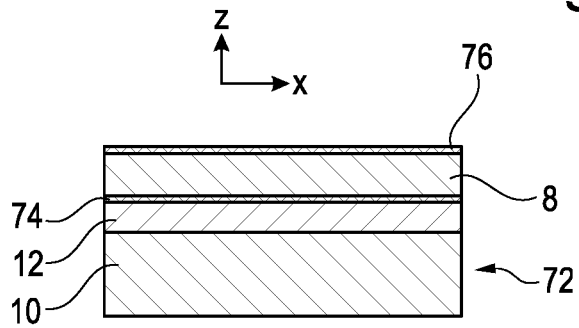
FIGS. 6 to 9 are schematic illustrations, in vertical cross-section, of different manufacturing states obtained in the implementation of the method of FIG. 5.
Figure 7:
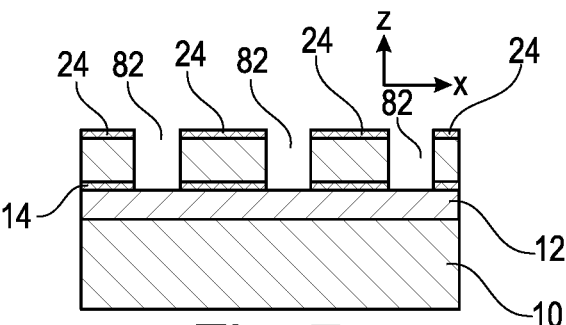

In this description, detailed exemplary embodiments are first described in a chapter I with reference to the figures. Next, in a chapter II, variants of these embodiments are presented. Finally, the advantages of the different embodiments are presented in chapter III.

Chapter I: Detailed Exemplary Embodiments

FIG. 1 represents an optical filtering device 2. The transmission response of the device 2 exhibits a single transmission peak corresponding to a high transmission ratio. In this application, the transmission ratio is said to be "high" if it exceeds 80% or 85%. This high transmission ratio is obtained for a wavelength $\lambda_0$. On either side of the transmission peak, the device 2 exhibits a high rejection ratio, that is to say a rejection ratio greater than 95% or 99%, even greater than 99.9%. This high rejection ratio is observed over ranges of wavelengths situated to the right and to the left of the transmission peak. These ranges each extend over a width greater than $\lambda_0/2$.

In this first embodiment, the transmission peak of the device 2 is in the mid-infrared, that is to say between a wavelength of 3 µm and a wavelength of 5 µm. Here, the wavelength $\lambda_0$ is equal to 4 µm.

The device 2 comprises two one-way optical filters 4 and 6 arranged one on top of the other in a vertical direction and separated from one another by an intermediate layer 8.

In FIG. 1, and in the subsequent figures, the orientation in space is identified with respect to an orthogonal reference frame XYZ. The direction Z is the vertical direction. The directions X and Y are contained in a horizontal plane. The direction X is parallel to the cutting plane of the device 2. Hereinbelow, the terms such as "high", "low", "above", "below", "higher", "lower" and similar are defined with respect to the direction Z.

The filter 4 is situated below the filter 6 and produced on the top face of a dielectric medium 10. The medium 10 has a refractive index $n_{10}$ at the wavelength $\lambda_0$ and a thickness $h_{10}$ in the vertical direction. Here, the medium 10 is a solid non-metallic substrate.

The direction of the incident electromagnetic radiation is represented by an arrow I in FIG. 1. The incident electromagnetic radiation is propagated vertically downwards. In this embodiment, the incident electromagnetic radiation has a polarization TM (Transverse Magnetic) with the electrical field in the plane XZ.

The filter 4 exhibits a very high transmission peak around the wavelength $\lambda_0$. Here, the maximum transmission ratio of the filter 4 is greater than 90%. To this end, the filter 4 is designed in accordance with the teaching of the U.S. Pat. No. 8,937,277B2 except that the width w of the slits is not necessarily chosen less than P/3. In this exemplary embodiment, the width w is chosen greater than P/3 but less than 2P/3.

The filter 4 extends primarily horizontally. In the vertical direction, it extends from a lower adjacent plane $P_{4inf}$ to a higher adjacent plane $P_{4sup}$. The planes $P_{4inf}$ and $P_{4sup}$ are horizontal. The planes $P_{4inf}$ and $P_{4sup}$ are situated at the interface between the filter 4 and external media of low refractive indices situated, respectively, below the plane $P_{4inf}$ and above the plane $P_{4sup}$. The medium of low refractive index situated under the plane $P_{4inf}$ is the medium 10. The medium of low refractive index situated above the plane $P_{4sup}$ is the layer 8.

Similarly, the filter 6 extends from a lower adjacent plane $P_{6inf}$ to a higher adjacent plane $P_{6sup}$. The planes $P_{6inf}$ and $P_{6sup}$ are, here, respectively symmetrical to the planes $P_{4sup}$ and $P_{4inf}$ with respect to a median horizontal plane $P_m$. The plane $P_m$ is the median plane of the layer 8. It is situated at mid-height of the layer 8. Like the planes $P_{4inf}$ and $P_{4sup}$, the planes $P_{6inf}$ and $P_{6sup}$ are situated at the interface between the filter 6 and external media of low refractive indices. Here, the medium of low refractive index situated under the plane $P_{6inf}$ is the layer 8. The medium of low refractive index situated above the plane $P_{6sup}$ is a medium 20.

Starting from the plane $P_{4inf}$ and working towards the plane $P_{4sup}$, the filter 4 comprises, in succession, directly deposited one on top of the other:—a plate 12 arranged on a top horizontal face of the medium 10, this plate having a refractive index $n_{12}$ at the wavelength $\lambda_0$ and a thickness $h_{12}$ in the vertical direction, and—reflective elements 14 deposited on a horizontal top face of the plate 12 situated on the side opposite the medium 10.

The filter 6 exhibits a very high transmission peak around the wavelength $\lambda_0$. To that end, it is structurally identical to the filter 4 except that the plate and the reflective elements are arranged in the reverse order. Thus, the filter 6 comprises, in succession, deposited on top of the other working from the plane $P_{6sup}$ to the plane $P_{6inf}$:—a plate 22 comprising a top horizontal face directly in contact with the medium 20, this plate having a refractive index $n_{22}$ at the wavelength $\lambda_0$ and a thickness $h_{22}$ in the vertical direction, and—reflective elements 24 deposited on a horizontal bottom face of the plate 22 situated on the side opposite the medium 20.

In this embodiment, the medium 20 is a gaseous medium whose refractive index $n_{20}$ at the wavelength $\lambda_0$ is less than the index $n_{22}$ and, preferably, less than $3n_{22}/5$ or less than 1.5. For example, the medium 20 is air. Air is particularly advantageous because it has a refractive index close to 1.

The plate 22 is identical to the plate 12 and fulfils the same function. The plate 22 is symmetrical to the plate 12 with respect to the plane $P_m$.

The reflective elements 24 are identical to the reflective elements 14. Furthermore, they are arranged with respect to one another in the same way as the reflective elements 14. In this embodiment, the reflective elements 24 are symmetrical to the reflective elements 14 with respect to the plane $P_m$.

The layer 8 is produced in a dielectric material having a refractive index $n_8$ at the wavelength $\lambda_0$. The refractive index $n_8$ is low, that is to say less than $3n_{12}/5$ and, preferably, less than 1.5. The thickness of the layer 8 is denoted $h_8$. The layer 8 extends from the plane $P_{4sup}$ to the plane $P_{6inf}$. The thickness $h_8$ is therefore equal to the distance which separates the planes $P_{4sup}$ and $P_{6inf}$. This thickness $h_8$ is chosen to create a moderate coupling between the evanescent fields generated by the filters 4 and 6. Such a choice for the thickness $h_8$ is explained in detail later.

The filter 4 is now described in more detail with reference to FIG. 2.

The plate 12 is transparent to the wavelength $\lambda_0$ and forms a waveguide and, preferably, a half-wave plate. For that, the plate 12 is produced in a dielectric material of strong refractive index. The expression "an element produced in a material X" means that this material X represents at least 90% or 95% of the mass of the element X. In this context, a "strong refractive index" means that the index $n_{12}$ is greater than the indices $n_{10}$ and $n_8$ and, preferably, greater than $5n_{10}/3$ and than $5n_8/3$.

Furthermore, the thickness $h_{12}$ of the plate 12 is chosen to form a half-wave plate in a range of wavelengths including the wavelength $\lambda_0$ and thus obtain an electromagnetic resonance in the plate 12. Typically, the thickness $h_{12}$ is between $0.8\lambda_0/(2n_{12})$ and $1.2\lambda_0/(2n_{12})$. Preferably, the thickness $h_{12}$ is chosen to be slightly less than $\lambda_0/(2n_{12})$. That makes it possible to render the spectral response better than if the strict law $\lambda_0/(2n_{12})$ of the guided mode alone is observed. An electromagnetic resonance is thus obtained in the plate 12.

The reflective elements 14 are produced in a material whose electrical permittivity is negative at the wavelength $\lambda_0$. Here, the reflective elements 14 are produced in metal and, in this example, in aluminium. The reflective elements 14 define a periodic grating of slits 30 intended to be passed through by the incident electromagnetic radiation. Preferably, the number of slits 30 is greater than $\lambda_0/\Delta\lambda$, where $\Delta\lambda$ is the mid-height width of the transmission peak at the wavelength $\lambda_0$. The grating of slits 30 is formed on the top face of the plate 12. The slits 30 emerge on the top face of the plate 12. The characteristics of the slits 30 are chosen such that the grating exhibits a transmission selectivity around the wavelength $\lambda_0$. Preferably, the thickness $h_{met}$ of the reflective elements 14 in the vertical direction is low, that is to say less than 50 nm or 100 nm. The thickness $h_{met}$ is also greater than the skin thickness $p_{met}(\lambda_0)$, at the wavelength $\lambda_0$, of the material used to produce the reflective elements 14. Typically, the thickness $h_{met}$ is between $p_{met}(\lambda_0)$ and $5 p_{met}(\lambda_0)$.

Here, the elements 14 are bands which extend continually in the direction Y and which are deposited on the plate 12.

The elements 14 form a single periodic grating of slits extending continually in the direction Y, of period P. In this example, the optical filtering property of interest is that obtained when the polarization of the incident electromagnetic radiation I is a rectilinear polarization referred to as transverse magnetic, that is to say with an electrical field in the plane XZ and a magnetic field parallel to the direction Y.

The period P is equal to the sum of the width L of an element 14 and of the width w of a slit 30. The period P is chosen to satisfy the following condition:

$$\lambda_0/n_{12} \leq P \leq 2\lambda_0/n_{12}.$$

The width w of the slits 30 is chosen to obtain a maximum transmission ratio greater than 90%. To this end, the width w is generally chosen between P/3 and 2P/3. By choosing the parameters of the filter 4 according to the principles set out above, an insulated filter 4 is obtained that exhibits:—a very high transmission peak, and a transmission peak of small width, namely less than 10% of the wavelength of the maximum of the transmission peak.

By contrast, given that the width w is chosen greater than P/3, the rejection ratios to the right and to the left of the transmission peak are fairly poor. For example, they are less than 90% over a spectral range $[0.75\lambda_0; 1.25\lambda_0]$.

For optimal operation of the filter 4, the reflective elements 14 are arranged in a medium of refractive index less than 1.5. Here, this medium is the layer 8.

The propagation mode of the electromagnetic wave which resonates in each of the plates 12 and 22 is associated with an evanescent field which decreases exponentially in the intermediate layer 8. The amplitude of the evanescent field decreases in the layer 8 according to a law approximated by the following relationship: $A_e = \exp(-|z|/\delta)$, where:—$A_e$ is the amplitude of the evanescent field at a distance z from the plate 12 inside the layer 8, —$\delta$ is a coefficient defined by the following relationship: $1/\delta = (2\pi n_8/\lambda_0)((\lambda_0/(n_8 P))^2 - 1)^{0.5}$, where P is the period of the grating of slits, —the symbol "exp" is the exponential function.

The coefficient $\delta$ thus defines a length of extension characteristic of the evanescent field. For example, when $z = \delta$, the amplitude of the evanescent field has lost approximately a third of its value. If z is greater than $4\delta$, then the amplitude of the evanescent field is practically zero and there is therefore practically no coupling between the evanescent fields radiated by the plates 12 and 22. It has been determined that a moderate coupling of the evanescent fields generated by the plates 12 and 22 takes place inside the layer 8 when the thickness $h_8$ is between $\delta$ and $3\delta$. Here, the thickness $h_8$ is chosen between $1.25\delta$ and $2.75\delta$ or between $1.5\delta$ and $2.5\delta$ or between $1.9\delta$ and $2.1\delta$. In this embodiment, the thickness $h_8$ is equal to $2\delta$. The choice of this thickness $h_8$ is justified by the experimental results below.

FIG. 3 represents, on one and the same graph, the transmission response of the isolated filter 4 (curve 50) and the transmission response of the device 2 (curve 52). The x axis indicates the wavelength in nanometres and the y axis indicates the corresponding transmission ratio expressed between 0 and 1, where the value 1 corresponds to a transmission ratio of 100%. The curves represented in FIG. 3 were obtained by simulation with the following numeric values and a polarization TM of the incident radiation:— $P = 1.6$ µm, —$w = 0.6$ µm, —$h_{met} = 20$ nm, —the reflective elements 14 and 24 are produced in aluminium, —the refractive indices $n_{12}$ and $n_{22}$ are equal to 4, which corresponds to the case where the plates 12 and 22 are produced in germanium, —the refractive indices $n_{10}$, $n_8$ and $n_{20}$ are equal to 1, which corresponds to an ideal case.

With these numeric values, the coefficient $\delta$ is equal to 277 nm. Thus, to obtain a moderate coupling of the evanescent fields, the thickness $h_8$ must be chosen between 346 nm and 761 nm. For the simulation of FIG. 3, the thickness $h_8$ is equal to 550 nm.

The maximum amplitude of the transmission peak of the insulated filter 4 is very high and reaches 94% for the wavelength equal to 4.07 µm. The maximum amplitude of the transmission ratio of the device 2 is also very high since it reaches 92% for the wavelength equal to 3.98 µm. The maximum amplitude of the transmission peak of the device 2 is greater than the maximum amplitude that is obtained in calculating it by convolution of the transmission responses of the insulated filters 4 and 6. In fact, this calculation gives a maximum amplitude equal to 88.3% (=$0.94^2$). Thus, the maximum amplitude of the transmission peak of the device 2 is better than that which would be obtained in the absence of moderate coupling of the evanescent fields of the filters 4 and 6.

The rejection ratio to the right and left of the transmission peak of the insulated filter 4 is less than 90%. Contrary to the insulated filter 4, the rejection ratio to the right and to the left of the transmission peak of the device 2 is very high and remains greater than 99%. For example, the rejection ratio is equal to 87.4% at the wavelength equal to 3.5 µm for the insulated filter 4 whereas it is equal to 99.4% for the device 2.

Thus, the device 2 exhibits both a very high transmission ratio and a very high rejection ratio outside of the transmission peak.

The resonance wavelength of the device 2 is also a little offset with respect to that of the insulated filter 4.

This result is explained by the fact that the evanescent fields generated in the layer 8 by the filters 4 and 6 overlap and interfere. This interference is constructive for the wavelengths corresponding to the transmission peak. Thus, a portion of the energy which would not normally have to be transmitted far by insulated filter, is transferred from the filter 6 to the filter 4 via their evanescent fields. That explains why, for a moderate coupling of the evanescent fields, the transmission ratio of the device 2 is greater than simply the square of the heights of the transmission peaks of the insulated filters.

Conversely, this interference of the evanescent fields in the layer 8 is destructive outside of the transmission peak. That explains why the rejection ratio of the device 2 also proves better than simply the square of the rejection ratios of the insulated filters 4 and 6.

If the thickness $h_8$ is chosen less than $\delta$, then the coupling of the evanescent fields of the filters 4 and 6 in the layer 8 is strong and no longer moderate. It has also been determined that a strong coupling completely distorts the transmission peak and degrades the transmission ratio and the selectivity of the device 2. This is illustrated in FIG. 4. The graph of FIG. 4 represents the transmission responses of the device 2 obtained by simulation for different thicknesses $h_8$. For these simulations, the other numeric values which characterize the device 2 are equal to those used to obtain the graph of FIG. 3. More specifically, the curves 60, 62, 64, 66 and 68 were obtained for values of the thickness $h_8$ equal, respectively, to 50 nm, 200 nm, 400 nm, 600 nm and 1200 nm.

The curves 60 and 62 correspond to a strong coupling of the evanescent fields. It can be seen that such a strong coupling splits into at least two the transmission peak which degrades the selectivity of the device 2 and also the rejection ratio outside of the transmission peak.

Conversely, if the thickness $h_8$ is chosen greater than 3δ, the coupling between the evanescent fields generated is very weak such that the improvement in the transmission ratio with respect to the case where the insulated filters 4 and 6 would not be coupled to one another via their evanescent fields is negligible or non-existent. This is illustrated by the curve 68 of FIG. 4. Furthermore, in the absence of coupling between the evanescent fields of the filters 4 and 6, a spurious transmission peak appears. In the graph of FIG. 4, this spurious transmission peak appears in the curve 68 around the wavelength equal to 2.6 μm.

An example of method for manufacturing the device 2 will now be described with reference to FIGS. 5 to 9.

Initially, in a step 70, a stack 72 (FIG. 6) of several layers is supplied. This stack 72 comprises, in succession working upwards:—the medium 10, —the plate 12, —an aluminium metallization layer 74, —the intermediate layer 8, and—an aluminium metallization layer 76.

The thickness of the layers 74 and 76 is equal to the thickness $h_{met}$. The top face of the layer 76 is directly exposed to the outside.

Here, the medium 10 and the layer 8 are made of amorphous silicon oxide whose refractive index is approximately 1.4 for a wavelength $\lambda_0$ equal to 4 μm. The plate 12 is produced in amorphous silicon whose refractive index is approximately 3.84 for the wavelength $\lambda_0$.

In a step 80, the stack 72 is etched to produce the reflective elements 14 and 24 in the layers, respectively, 74 and 76. For that, vertical trenches 82 (FIG. 7) are hollowed out from the outer face of the layer 76 and stop on the top face of the plate 12. Each of these trenches 82 passes successively through the layer 76, the layer 8 and the layer 74.

Figure 8:
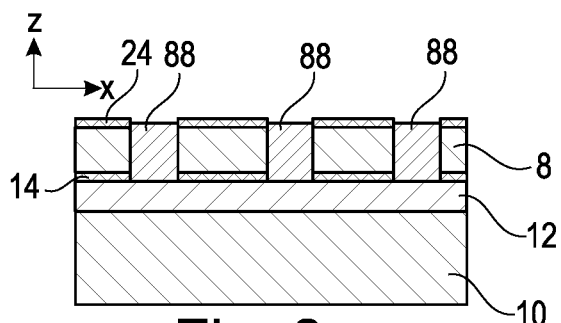

In a step 86, the trenches 82 are filled with a dielectric material 88 whose refractive index is low (FIG. 8). For example, the material 88 is silicon oxide. Then, the top face is polished, for example by a mechano-chemical polishing method, to make it flat and expose the top face of the reflective elements 24.

Figure 9:
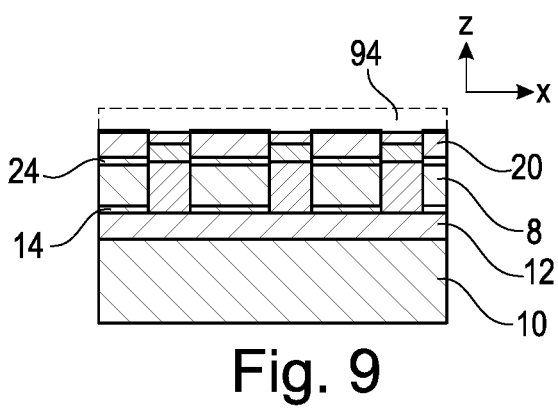
Figure 10:
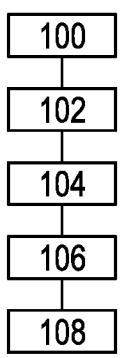
FIG. 10 is a flow diagram of a second method for manufacturing the device of FIG. 1.

In a step 90, the plate 22 is deposited on the exposed face of the reflective elements 24 previously produced (FIG. 9).

If necessary, in a step 92, a coating 94 (FIG. 9) is deposited on the top face of the plate 24. For example, the coating 94 is a protective layer or an anti-reflection layer.

Another method for manufacturing the device 2 will now be described with reference to FIGS. 10 to 14.

This method begins with the supply, in a step 100, of a stack identical to the stack 72 except that the layers 8 and 76 are omitted.

Figure 11:
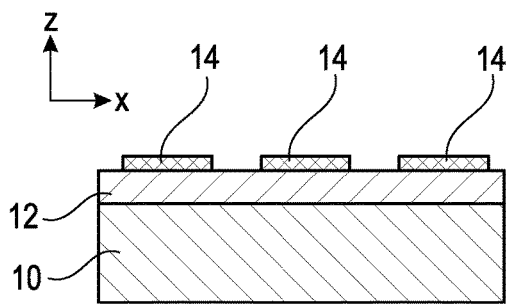
FIGS. 11 to 14 are schematic illustrations, in vertical cross-section, of different manufacturing states obtained in the implementation of the method of FIG. 10.

In a step 102, the metallization layer 74 is etched to form the reflective elements 14 on the top face of the plate 12 (FIG. 11).

Figure 12:
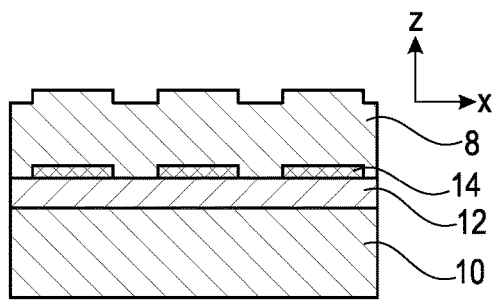
Figure 13:
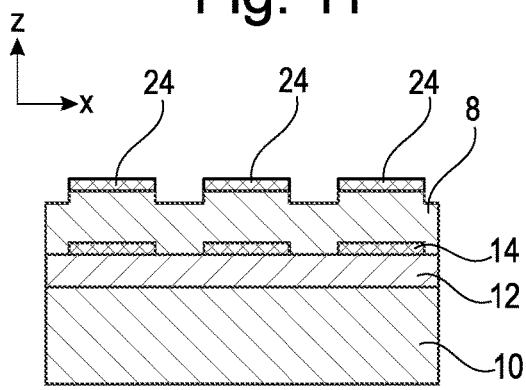

Next, in a step 104, the intermediate layer 8 is deposited on the reflective elements 14 (FIG. 12). Given that the reflective elements 14 are separated from one another by slits, the face on which the layer 8 is deposited is not flat. The result thereof is that nor is the top face of the layer 8 after its deposition flat. It exhibits unevennesses with respect to each reflective element 14.

In a step 106, the reflective elements 24 are produced on the top face of the layer 8. In this embodiment, the top face of the layer 8 is not polished before producing the reflective elements 24. For example, the reflective elements 14 are produced by the deposition of a metallization layer on the top face of the layer 8 then by etching of this metallization layer.

Figure 14:
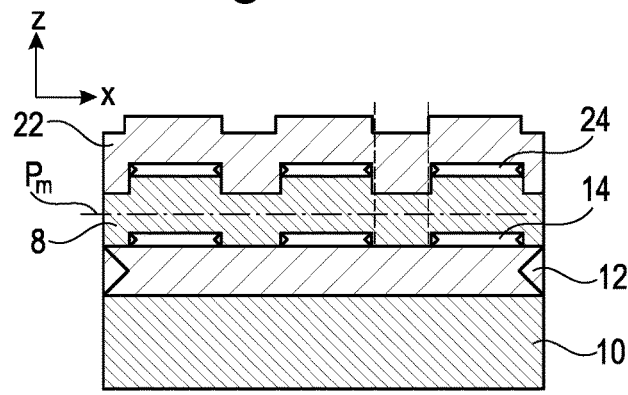

Finally, in a step 108, the plate 22 is deposited on the reflective elements 24 (FIG. 14). For example, as for the deposition of the layer 8, since the plate 22 is deposited on a face which is not flat, its top face comprises unevennesses with respect to each of the reflective elements 24. Here, because of these unevennesses on the top face of the plate 22, the plate 22 is not exactly symmetrical to the plate 12 with respect to the plate $P_m$. However, it has been observed that even in this embodiment, the optical filtering device obtained exhibits a high transmission ratio and high rejection ratios on either side of the transmission peak.

Figure 15:
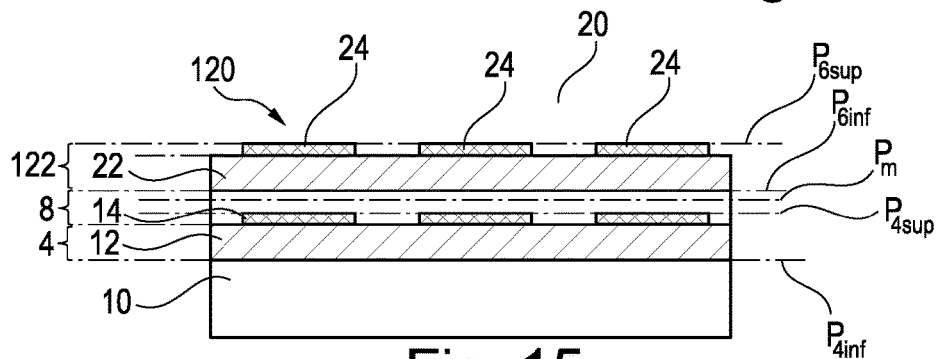
FIG. 15 is a view, in vertical cross section, of a second embodiment of an optical 3 filtering device.

FIG. 15 represents an optical filtering device 120 identical to the device 2 except that the filter 6 is replaced by an optical filter 122. The filter 122 is identical to the filter 6 except that the order in which the plate 22 and the reflective elements 24 are stacked on one another is reversed. In other words, in this embodiment, the bottom face of the plate 22 is flush with the plane $P_{6inf}$ and the reflective elements 24 are arranged on the top face of the plate 22 in contact with the medium 20.

Figure 16:
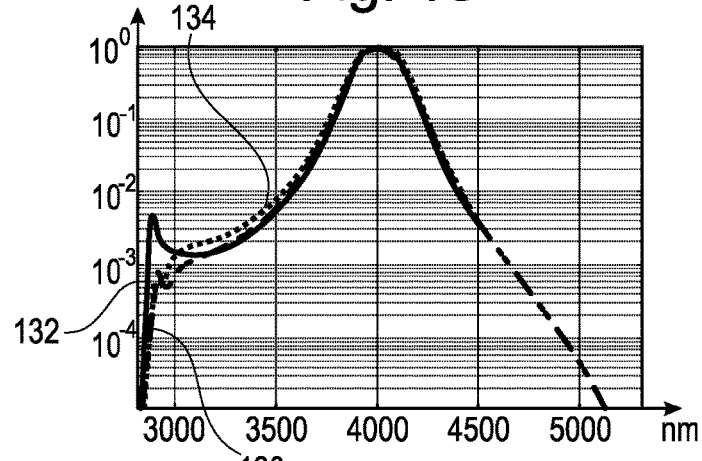
FIG. 16 is a plot of the transmission response of the devices of FIGS. 1 and 15.

FIG. 16 represents the transmission response of the device 2 (curve 130) and of the device 120 (curve 132). In this graph, the scale of the y axis is logarithmic. It can be observed that the maximum amplitude of the transmission peak of the device 2 is slightly greater than the maximum amplitude of the transmission peak of the device 120. Here, a difference of approximately 1.6% is observed. Likewise, the device 2 exhibits a rejection ratio slightly greater than that of the device 120. However, although the performance levels of the device 120 are a little lower than those of the device 2, the transmission and rejection ratios obtained with the device 120 remain much better than those obtained with the insulated filter 4 or with a superposition of the filters 4 and 6 but without moderate coupling of their evanescent fields.

The graph of FIG. 16 also comprises a curve 134 which corresponds to an optical filtering device identical to the device 2 except that the reflective elements 24 are offset, for example in the direction X, by a pitch equal to P/4. As for the device 120, the performance levels of this embodiment are a little lower than those of the device 2 but the transmission and rejection ratios obtained remain much better than those obtained with the insulated filter 4 or with the superposition of the filters 4 and 6 but without moderate coupling of their evanescent fields.

Figure 17:
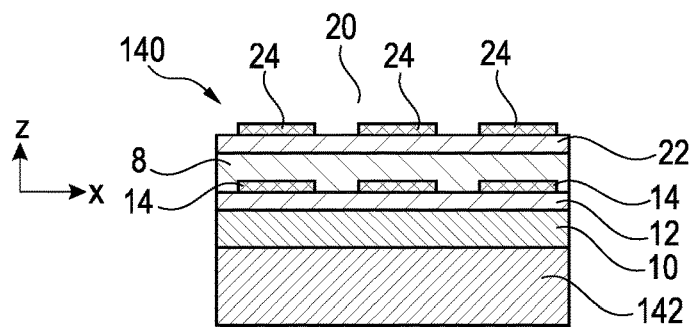
FIG. 17 is a view, in vertical cross-section, of a third embodiment of an optical filtering device.

FIG. 17 represents an optical filtering device 140. The device 140 is identical to the device 120 except that the medium 10 is deposited on a support 142 which has a high refractive index $n_{142}$. The index $n_{142}$ is greater than 1.5 or than 2. For example, the support 142 is produced in silicon or in germanium. In this case, the medium 10 forms, preferably, a quarter-wave plate. For that, the thickness $h_{10}$ of the medium 10 is chosen between $0.9M\lambda_0/(4n_{10})$ and $1.1M\lambda_0/(4n_{10})$, where M is an odd integer number chosen in advance. Here, the thickness $h_{10}$ is equal to $M\lambda_0/(4n_{10})$.

Figure 18:
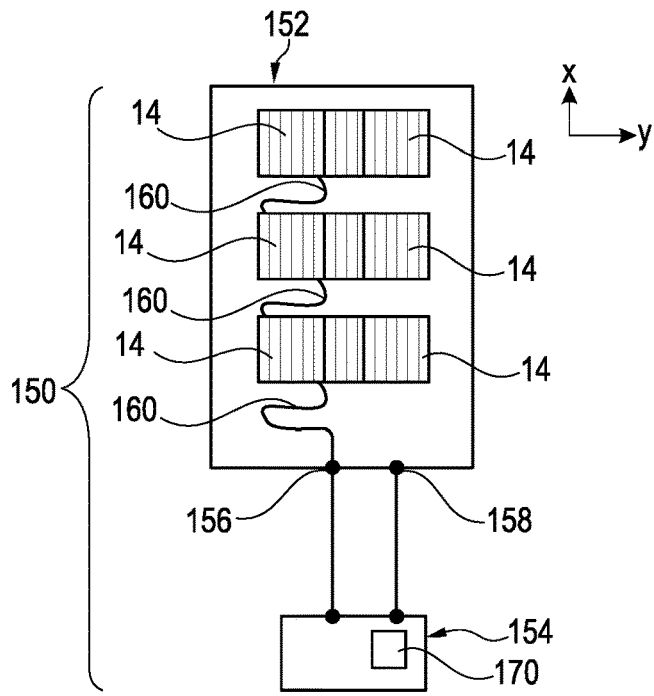
FIG. 18 is a schematic illustration of a tunable optical filtering 5 unit.

FIG. 18 represents a tunable optical filtering unit 150. The unit 150 comprises an optical filtering device 152 and a voltage source 154. The device 152 is, for example, identical to the device 2 except that it comprises two connection terminals 156 and 158. All the reflective elements 14 are electrically connected to the terminal 156. All the reflective elements 24 are electrically connected to the terminal 158.

The reflective elements 14 and the terminal 156 are electrically insulated from the reflective elements 24 and from the terminal 158.

To simplify FIG. 18, only the reflective elements 14 are represented. Here, the reflective elements 14 are connected electrically to one another via very thin wires 160. For example, the width of these wires 160 is less than 150 nm or 100 nm. Here, the width of the wires 160 is equal to 100 nm. At least one of these wires 160 electrically connects the elements 14 to the terminal 156.

The reflective elements 24 are connected to the terminal 158 in a way similar to that described for the reflective elements 14. Thus, when a potential difference is generated between the terminals 156 and 158, an electrical field is generated in the intermediate layer 8.

In this embodiment, the intermediate layer 8 is produced in a dielectric material which is, in addition, an electro-optical material, that is to say a material in which it is possible to modify the refractive index under the effect of a steady-state or low-frequency electrical field. In particular, one of the best known nonlinear effects is the Pockels effect in which the change of index is directly proportional to the electrical field passing through it. In this case, the variation $\Delta n_8$ of refractive index $n_8$ can be expressed as $\Delta n_8 = n_8^3 \times R \times E$, where: —R is an electro-optical coefficient characteristic of the material used to produce the layer 8, —E is the amplitude of the electrical field which passes through the layer 8, and—the symbol "x" denotes the scalar multiplication operation. For organic polymer materials, of refractive index between 1.6 and 1.8, charged with chromophores, the coefficient R can be of the order of 100 pm/V, even more. As an example, such a polymer material is PMMA (polymethyl methacrylate). If U is the potential difference applied between the two terminals 156 and 158, the amplitude E of the electrical field in the layer 8 is equal to $U/h_8$. Chromophores likely to be used to produce the electro-optical material are for example cited in the following article: J. LIU et Al: "*Recent advances in polymer electro-optic modulators*", RSC Adv., 2015, 5, 15784-15794.

The source 154 is electrically connected between the terminals 156 and 158. It is capable of generating a potential difference between these terminals 156 and 158. Here, the source 154 comprises a module 170 for setting the potential difference between the terminals 156 and 158.

Consequently, by adjusting the potential difference between the terminals 156 and 158 using the module 170, it is possible to modify certain characteristics of the device 152 such as, for example, the position of its transmission peak or the modulation of its amplitude. For example, with a height $h_8$ equal to 500 nm, a potential difference U equal to 50 Vdc and a coefficient R equal to 100 pm/V, the variation $\Delta n_8$ of refractive index $n_8$ is equal to 0.1.

Figure 19:
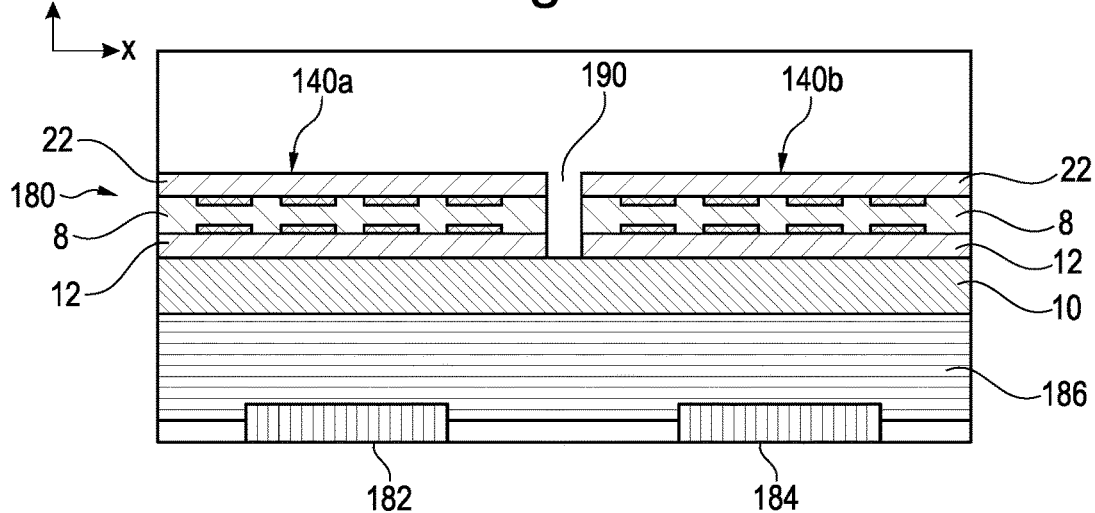
FIG. 19 is a schematic illustration, in vertical cross-section, of a detector incorporating a grating of optical filtering devices.

FIG. 19 represents a multi-pixel detector 180. This detector 180 comprises a matrix of incident electromagnetic radiation detection cells. Here, each of these cells is formed by a detecting diode produced in a semiconductor substrate 186. To simplify FIG. 19, only two detecting diodes 182 and 184 are represented. The junctions of these diodes 182, 184 are produced in this substrate 186.

An optical filtering device is placed in front of each of these diodes. Here, this filtering device is, for example, identical to the device 140 except that the support 142 is replaced by the substrate 186. The optical filtering devices situated in front of the diodes 182, 184 respectively bear the numeric references 140a and 140b.

In this embodiment, the substrate 186 and the medium 10 are common to all the optical filtering devices. The substrate 186 and the medium 10 therefore extend horizontally and continually in front of each of the detecting diodes.

A trench 190 is hollowed out along the periphery of each of the devices 140a and 140b in order to minimize the interferences between these different optical filtering devices. For example, the trench 190 separates the plates 12, 22 and the intermediate layer 8 of each of the filtering devices from the plates 12, 22 and from the intermediate layer 8 of the filtering devices situated immediately alongside.

Furthermore, if necessary, the characteristics of the device 140a can be different from the characteristics of the device 140b. For example, the period P of the device 140a is different from the period P of the device 140b.

Figure 20:
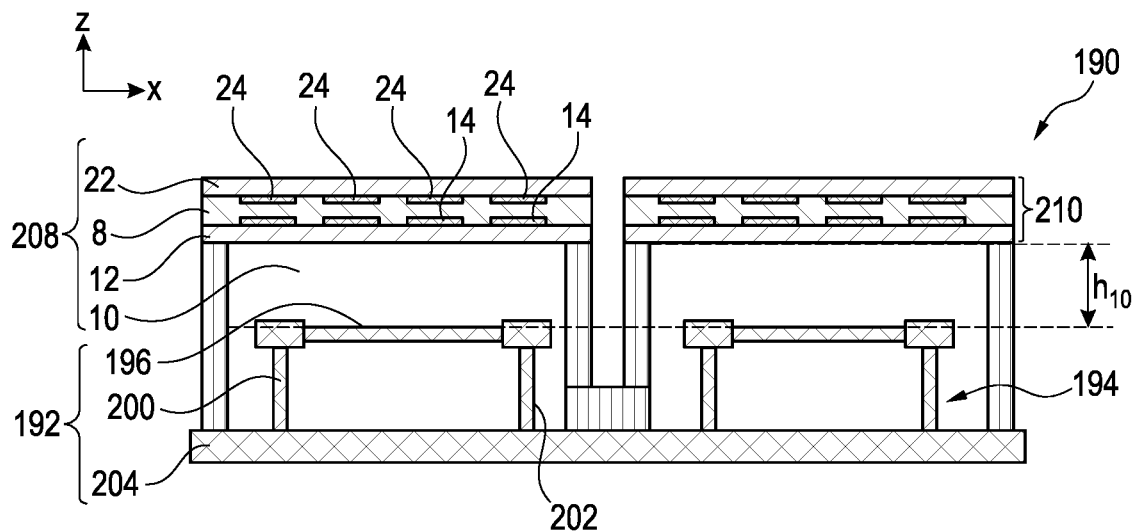
FIG. 20 represents a multi-pixel detector.

FIG. 20 represents another multi-pixel detector 190 identical to the detector 180 except that each detection cell is formed by a bolometer of micrometric size. To simplify FIG. 20, only two identical bolometers 192 and 194 are represented. Each bolometer 192, 194 makes it possible to measure the energy of the incident electromagnetic radiation in the infrared range. Such bolometers are known and only the main production details of these bolometers are reviewed here. The bolometer 192 comprises a thermo-resistive membrane 196 supported by pillars 200, 202, on top of a reflective substrate 204. Typically, the distance which separates the substrate 204 from the membrane 196 is equal or approximately equal to a quarter of the wavelength to be absorbed. Here, each bolometer is encapsulated in a cavity hollowed out to insulate it from the outside medium, as notably explained in the patent EP1243903B1. The walls of this cavity are, for example, produced in amorphous silicon. In this example, a filtering device is produced above each bolometer. Here, the filtering devices situated above, respectively, the bolometers 192 and 194 respectively bear the numeric references 208 and 210. The filtering devices 208 and 210 are identical, for example, to the device 2. Here, the medium 10 of each of these filtering devices corresponds to the medium filling the interior of the hollowed-out cavity in which the bolometer is situated. In this embodiment, the plate 12 forms the top wall of the hollowed-out cavity. In these conditions, the thickness $h_{10}$ of the medium 10 is equal to the distance separating the plate 12 from the membrane 196 of the bolometer. As described previously, preferably, the thickness $h_{10}$ is between $0.9 \, M\lambda_0/(4n_{10})$ and $1.1 M\lambda_0/(4n_{10})$, where M is an odd integer number chosen in advance. Typically, in the case of a bolometer, the medium 10 is a vacuum.

Figure 21:
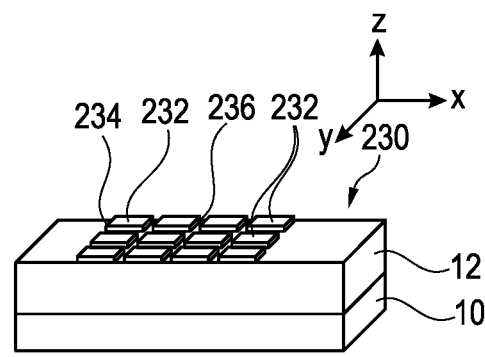
FIG. 21 represents another possible embodiment of the optical filtering device of FIG. 1.

FIG. 21 represents another possible embodiment of a two-dimensional filter 230 that can be used in place of the filters 4 and 6. The filter 230 is identical to the filter 4 except that the reflective elements 14 are replaced by reflective elements 232. The reflective elements 232 are identical to the reflective elements 14 except that they each have a rectangular horizontal section and therefore form blocks aligned one behind the other in the directions X and Y. In this embodiment, the reflective elements 232 are arranged with respect to one another in such a way as to define two periodic gratings of slits 234 and 236 of respective widths $w_{234}$ and $w_{236}$ and of respective periods $P_{234}$ and $P_{236}$. These two gratings are mutually orthogonal. In this case, by taking the periods $P_{234}$ and $P_{236}$ as equal and by taking the widths $w_{234}$ and $w_{236}$ as equal, the filter 230 is insensitive to the polarization of the incident electromagnetic radiation.

When the filter 230 is used in place of the filters 4 and 6 to form an optical filtering device designed by applying the teaching given for the device 2, the rejection ratio, on either side of the transmission peak, is improved. Preferably, for that, the widths $w_{234}$ and $w_{236}$ are chosen to be relatively narrow, namely to lie rather between $P_{234}/5$ and $P_{234}/3$. The thickness of the reflective elements 232 is preferably around 50 nm and less than 100 nm. In fact, when two-dimensional filters are used in place of the one-dimensional filters, spurious secondary peaks, linked to another transverse waveguide mode in the plates 12 and 22, can appear on either side of the main transmission peak, and then affect the rejection ratio. Now, the excitation of these secondary peaks is promoted with an excessive width $w_{234}$. Thus, the width $w_{234}$ must be adapted to obtain an acceptable trade-off between the rejection ratio desired over the entire spectral range of study and the desired transmission peak amplitude. In all cases, an optical filtering device produced with two-dimensional filters makes it possible to obtain rejection ratios better than those obtained with only the filter 230.

Chapter II: Variants

Variants of the Reflective Elements:

In another embodiment of the filter 230, the orthogonal projection of a reflective element on a horizontal plane is a parallelogram and not necessarily a rectangular parallelogram. The horizontal section of the reflective elements is not necessarily square. In this latter case, the periods $P_{234}$ and $P_{236}$ are not equal. If the periods $P_{234}$ and $P_{236}$ are not equal, the thickness $h_8$ is chosen to lie within the intersection of the ranges [1.25 $\delta_{234}$; 2.75 $\delta_{234}$] and [1.25 $\delta_{236}$; 2.75 $\delta_{236}$], where:—the coefficient $\delta_{234}$ is defined by the following relationship: $1/\delta_{234} = (2\pi n_8/\lambda_0)((\lambda_0/(n_8 P_{234}))^2 - 1)^{0.5}$, where $P_{234}$ is the period of the grating of slits 234, and—the coefficient $\delta_{236}$ is defined by the following relationship: $1/\delta_{236} = (2\pi n_8/\lambda_0)((\lambda_0/(n_8 P_{236}))^2 - 1)^{0.5}$, where $P_{236}$ is the period of the grating of slits 236. The periods $P_{234}$ and $P_{236}$ are sufficiently close for the intersection between these two ranges not to be empty.

As a variant, the reflective elements 24 are not necessarily symmetrical to the reflective elements 14. For example, they are offset in any horizontal direction by a distance less than the period P. For example, the reflective elements 24 are offset, in a horizontal direction, by a distance equal to P/2 or P/4. In this case, the elements 24 are arranged with respect to one another like the elements 14 but are no longer symmetrical to the elements 14 with respect to the plane $P_m$.

In another variant, the reflective elements are deposited on each of the faces of the plate 12. In this case, the plate 12 comprises a first grating of slits on its bottom face and a second grating of slits on its top face. Preferably, these first and second gratings of slits are structurally identical. For example, they are each identical to the grating of slits defined by the reflective elements 14 or 232. Similarly, reflective elements are deposited on each of the faces of the plate 22 and the gratings of slits formed on each of the faces of the plate 22 are identical, respectively, to the first and second gratings of slits.

The reflective elements can be produced in materials other than aluminium. For example, they are produced in silver. Aluminium and silver are good choices, in particular, for the production of an optical filtering device whose transmission peak is in the visible range, that is to say typically between 400 nm and 800 nm. However, other metals can also be used such as gold, copper, platinum or an alloy thereof.

Moreover, the metals can be replaced by any material exhibiting reflective properties similar to those of the metals in the range of wavelengths targeted by the filtering. In particular, a material that has a relative permittivity with high imaginary part, namely of the order of 10 or more, that is to say a strongly conductive or strongly absorbent material, can be used. For example, silicon can be used in the ultraviolet (10 nm to 380 nm) and strongly N-doped silicon can be used in the infrared. An ionic crystal exhibiting a negative permittivity can also be used, such as SiC, in the far infrared (towards 10-12 µm) for example.

Likewise, in the examples previously illustrated, the reflective elements forming the gratings of slits are deposited directly on the plates 12 and 22. As a variant, a thin layer is provided, of the order of a tenth of the thickness of the plate, and of refractive index lower than that of the plate, so as to modify the refractive index on contact with the plate. This additional thin layer is, for example, a graded index layer and can moreover fulfil another function, such as a securing, passivation or protection function.

As a variant, even for a one-way filter, the width w can also be chosen less than P/3 to have a highly selective filter exhibiting a rejection ratio better than that obtained with a filter constructed in accordance with the teaching of the application U.S. Pat. No. 8,937,277B2. In this case, the transmission ratio is not necessarily improved.

Variants of the Plate:

Other materials can be used to produce the plates 12 and 22. For example, the plates 12 and 22 can be produced in GaP, AlAs, GaSb, or PbTe which exhibit high refractive indices in the optical range. GaP is a good choice if the transmission peak of the device is in the visible range. Also, a silicon-rich (x>1) silicon nitride $Si_xN_{1-x}$, less costly, can be used in the visible.

Variants of the Intermediate Layer 8 and of the Media 10 and 20:

Other materials can be used to produce the intermediate layer 8 and the media 10 and 20. For example, the material used can be one of the following materials: $MgF_2$, $BaF_2$, $CaF_2$, LiF. $MgF_2$ is a good choice if the transmission peak of the device is in the visible range.

The layer 8 and the media 10 and 20 can also be produced by a stacking of several materials of low refractive indices.

The layer 8 and the medium 10 are not necessarily produced in a material in the solid state. They can also be produced using a material in the gaseous state, such as air or liquid. In the case of a material in gaseous or liquid state, shims produced in a material in solid state are interposed between the filters 4 and 6 to obtain the desired thickness of the intermediate layer 8. The use of a material in gaseous state for the production of the layer 8 is advantageous notably if the transmission peak is situated in the visible wavelength range.

In another embodiment, the intermediate layer 8 is a polarizable conductive transparent oxide (for example ITO), connected electrically to a third terminal, and the reflective elements 14 and 24 are situated, respectively, in the planes $P_{4inf}$ and $P_{6sup}$ of the stack and each connected to the terminals 156 and 158. In this configuration, an electrical field between the intermediate layer 8 and the reflective elements can be applied to modify the refractive index of the waveguide plates 12 and 22.

The medium 20 is not necessarily a gaseous medium. The medium 20 can also be a material in solid or liquid state whose refractive index satisfies the same conditions as those stated for the medium 20.

The layer 8 and the media 10 and 20 are non-metallic.

Other Variants:

In the device 152, as a variant, the reflective elements 14 are electrically connected to the terminal 156 via a film that is electrically conductive and transparent to the incident electromagnetic radiation. This film is, for example, deposited over the entire top surface of the reflective elements 14 and of the slits 30. For example, this film can be produced in ITO (indium tin oxide) and have a thickness of approximately 50 nm.

In another embodiment of the device 152, the electrical field in the layer 8 is generated using conductive plates situated, respectively, above the plate 22 and below the plate 12 and no longer using reflective elements 14 and 24. In this case, it is these conductive plates which are connected to the terminals 156, 158.

The layer 8 of the device 152 can be produced in other electro-optical materials. For example, the layer 8 can be produced based on nematic liquid crystals, whose effective refractive index, of the order of 1.5 to 2, can be modified by application of a polarization voltage applied between the terminals 156 and 158. In this case, the modification of the refractive index $n_8$ is caused by a change of orientation of the molecules of the layer 8. That has been demonstrated, for example, in the article "*Polarization-independent actively tunable colour generation on imprinted plasmonic surfaces*" by D. Franklin et al., Nat Commun 6, 7337 (2015).

As a variant, the optical filtering device comprises more than two identical optical filters stacked one on top of the other in the direction Z. In this case, the intermediate layer which separates two optical filters that are immediately consecutive in the direction Z is produced as described for the layer 8.

The different variants of the optical filters described in the U.S. Pat. No. 8,937,277 can be applied to the case of the optical filters of the filtering devices described here.

The device 2 described above with a grating of strips extending in the direction Y does not exhibit a transmission peak of great amplitude for a TE (transverse electrical) polarized incident electromagnetic radiation whose electrical field is parallel to the direction Y. To remedy this drawback, it is possible to arrange, upstream of the device 2, a polarization conversion system which converts the non-polarized or TE polarized incident electromagnetic radiation into an electromagnetic radiation exhibiting just a TM polarization. For example, the article "*Efficient and monolithic polarization conversion system based on a polarization grating*", by J. Kim et al, Applied Optics 51, 4852 (2012)) describes such a microstructured and compact system with a conversion efficiency close to 90%. The electromagnetic radiation for which the polarization has been converted then passes through the device 2. The association of the conversion system and of the device 2 makes it possible to maximize the power of the flux transmitted by the filtering device.

The teaching given in this text can also be implemented by using the filters 4 and 6 whose transmission peaks are not high. In this case, the device 2 exhibits a transmission peak higher than the square of the amplitude of the peaks of the filters 4 and 6 without in any way being necessarily greater than 85% or 90%. Similarly, the rejection ratio of the device 2 is not necessarily greater than 90%, but remains in all cases greater than that of the filters 4 and 6 taken alone.

Chapter III: Advantages of the Embodiments Described

The fact that each of the optical filters conforms to practically all the teachings of U.S. Pat. No. 8,937,277B1 makes it possible to obtain an optical filtering device which retains the advantages of the optical filters described in that patent. Thus, in particular, the optical filtering device is compact. It is tunable in an extended range of wavelengths, ranging from 250 nm to a hundred or so micrometres. It has a selective transmission passband, namely a mid-height width of the transmission peak less than 10% of the wavelength for which the peak is maximum.

Furthermore, because of the existence of a moderate coupling of the evanescent fields of the filters 4 and 6, the device exhibits both a higher transmission ratio and a higher rejection ratio over a spectral band around the transmission peak of a width at least equal to half the wavelength for which the peak is maximum. In this spectral band, the rejection ratio is typically greater than 90%.

Choosing the width w greater than P/3, notably when one-way filters are used, makes it possible to obtain a transmission ratio greater than 80% or 85%.

When the reflective elements are flush with the planes $P_{4sup}$ and $P_{6inf}$, the transmission and rejection ratios are improved.

Producing the reflective elements in silver or in aluminium makes it possible to minimize the optical losses by absorption and improve the transmission ratio notably when the wavelength $\lambda_0$ is in the visible range.

When the refractive index $n_8$ is less than 1.5, the transmission ratio is improved.

Producing the intermediate layer in a material which is also electro-optical makes it possible to dynamically modify the characteristics of the optical filtering device.

The fact that the reflective elements are rectangular makes it possible to obtain a grating of slits parallel to the direction X and a grating of slits parallel to the direction Y. Thus, the device makes it possible to transmit both the component of the electromagnetic radiation polarized parallel to the slits, and also the orthogonally polarized component.

The invention claimed is:

1. An optical filtering device having a transmission response with a maximum at a wavelength $\lambda_0$, said device comprising:
    a first optical filter which extends from a first lower adjacent plane to a parallel first higher adjacent plane, each of these first adjacent planes being situated at the interface between the first filter and an external medium, said first optical filter comprising in succession working from the first adjacent plane to the other first adjacent plane:
        a plate having a refractive index $n_{12}$ at the wavelength $\lambda_0$ and whose thickness is between $0.8\lambda_0/(2n_{12})$ and $1.2\lambda_0/(2n_{12})$, the refractive index $n_{12}$ being greater than $5n_{10}/3$, where $n_{10}$ is the greatest of the refractive indices chosen from the group consisting of the refractive indices at the wavelength $\lambda_0$ of the media situated at the interface with the first filter,
        reflective elements, produced in a material with negative electrical permittivity at the wavelength $\lambda_0$, deposited on a face of the plate, these reflective elements defining a periodic grating of parallel through slits forming a bandpass filter around the wavelength $\lambda_0$, the period of said grating of through slits being between $\lambda_0/n_{12}$ and $2\lambda_0/n_{12}$,
    wherein the device also comprises:
        a second optical filter situated on top of the first optical filter and which extends from a second lower adjacent plane to a parallel second higher adjacent plane, said second optical filter comprising a plate identical to the plate of the first optical filter and reflective elements deposited on a face of said plate of the second optical filter and which define a periodic grating of slits identical to the periodic grating of slits of the first optical filter, an intermediate layer which extends from the first higher plane to the second lower plane, said intermediate layer having a refractive index $n_g$ at the wavelength $\lambda_0$ and a thickness $h_g$, the refractive index $n_g$ being less than $3n_{12}/5$ and the thickness $h_g$ being between $\delta$ and $3\delta$, where the coefficient $\delta$ is defined by the following relationship:

$$1/\delta = (2\pi n_g/\lambda_0)((\lambda_0/(n_g P))^2 - 1)^{0.5},$$

where P is the period of the grating of slits.

2. The device according to claim 1, wherein the thickness $h_g$ is between $1.25\delta$ and $2.75\delta$.

3. The device according to claim 1, wherein the width of the slits is greater than P/5.

4. The device according to claim 3, wherein the width of the slits is less than 2P/3.

5. The device according to claim 1, wherein the reflective elements define a single grating of periodic slits and the width of the slits of said periodic grating is greater than P/3.

6. The device according to claim 1, wherein the reflective elements of the first filter are flush with the first higher adjacent plane and the reflective elements of the second filter are flush with the second lower adjacent plane.

7. The device according to claim 1, wherein the reflective elements are produced in silver or in aluminium.

8. The device according to claim 1, wherein the refractive index $n_g$ is less than or equal to 1.5.

9. The device according to claim 1, wherein:
the intermediate layer is produced in an electro-optical material whose refractive index $n_g$ varies as a function of the amplitude E of the electrical field which passes through the intermediate layer, and
the device comprises:
a first connection terminal to which the reflective elements of the first optical filter are electrically connected, and
a second connection terminal to which the reflective elements of the second optical filter are electrically connected, the first and second connection terminals being electrically insulated from one another.

10. A tunable optical filtering device, wherein said device comprises:
an optical filtering device that conforms to claim 9,
a voltage source electrically connected between the connection terminals of the filtering device, said voltage source being able to generate a potential difference between these two connection terminals, said voltage source comprising a module for adjusting the potential difference generated.

11. The device according to claim 1, wherein the number of slits of the grating of slits is greater than $\lambda_0/\Delta\lambda$, where $\Delta\lambda$ is the mid-height width of the transmission peak at the wavelength $\lambda_0$.

12. The device according to claim 1, wherein:
the orthogonal projection of each reflective element on one of the adjacent planes is a parallelogram of which two sides are parallel to a first direction and of which the other two sides are parallel to a second direction that is not colinear with the first direction,
these reflective elements are arranged periodically with respect to one another in the first and second directions to define a first periodic grating of through slits parallel to the first direction and a second periodic grating of slits parallel to the second direction.

13. The device according to claim 12, wherein the orthogonal projection of each reflective element on an adjacent plane is a square.

14. The device according to claim 1, wherein the reflective elements are produced in metal and their thickness is greater than the skin thickness at the wavelength $\lambda_0$.

15. A detector comprising:
one or more cells for detecting an incident electromagnetic radiation, and
a device for filtering the incident electromagnetic radiation situated in front of each detection cell,
wherein the filtering device conforms to claim 1.

* * * * *